United States Patent [19]

Miyazawa

[11] 4,062,323

[45] Dec. 13, 1977

[54] PROTECTOR FOR THE UDDER OF A COW

[76] Inventor: Mansanori Miyazawa, 22-5, 2-chome, Ando, Shizuoka, Japan

[21] Appl. No.: 716,259

[22] Filed: Aug. 20, 1976

[30] Foreign Application Priority Data

Sept. 29, 1975 Japan ............................ 50-133598[U]

[51] Int. Cl.² ............................................. A01K 29/00
[52] U.S. Cl. .................................................. 119/146
[58] Field of Search ............... 119/146, 126, 127, 128; 128/133

[56] References Cited

FOREIGN PATENT DOCUMENTS 2,034,045  1/1972  Germany .............................. 119/126

Primary Examiner—Hugh R. Chamblee

[57] ABSTRACT

A known udder protector composed of a rigid foamed synthetic resin elastic material, which has a relatively thick doughnut-like annular shape, the central hole of which constitutes a part for fitting and attaching an ankle of a dairy cow, one part of the annular protector being cut and separated in the radial direction and both the cut ends being pressed against each other so that they can be forcibly separated from each other and the cow ankle can be insertedinto the central hole from the side through a clearance formed between the cut ends, is combined with a connecting member comprising two arcuate plates fitted closely on both surfaces of the protector to cover the cut part of the protector. Each arcuate plate includes on the face confronting the other arcuate plate, male and female projections which are inserted into holes formed on both the sides of the protector with the cut and separated part being the boundary and are engaged with female and male projections of the other arcuate plate.

6 Claims, 13 Drawing Figures

PROTECTOR FOR THE UDDER OF A COW

BACKGROUND OF THE INVENTION

1. Field of the Invention

The present invention relates to an improvement in an udder protector to be fitted to an ankle of a hind leg of a cow for preventing the hind leg from stamping on the udder and injuring the udder.

2. Brief Description of the Prior Art

Udders of cows are well developed as a result of artificial improvements and they hang down between the two hind legs. Accordingly, when a cow lies down, the udder is kept in the state embraced by both the hind legs, and when the cow stands up, the udders, especially the nipple portions, are often tred on or stamped on by the calcaria and hooves of the hind legs, and they are often injured. These wounds are very miserable and are not readily curable, and the milk-secreting activity is remarkably reduced by these wounds and in serious cases, the injured cows become quite valueless, resulting in a great loss to dairy farmers.

Various udder protectors for preventing the hind legs from treding on the udders and injuring them in cows have been proposed.

For example, there can be mentioned a net protector which is hung down from the back of a cow like a hammock so that the udders of the cows are wrapped in and supported by this net protector, and a gaiter-like protector is attached around an ankle of a hind leg of the cow. Each of these known protectors, however, has a complicated structure and the mounting and dismounting operations are very troublesome.

In view of such state of the art, I previously proposed an udder protector which has a very simple structure and the mounting and dismounting operations of which can be performed very easily.

As illustrated in FIG. 1, this previously proposed udder protector which is composed of a relatively rigid and thick cellular synthetic resin material having a good restoring elasticity has a doughnut-like annular shape having a relatively broad width, and the width portion of the annular protector is cut at one part in the radial direction. When this protector is actually employed, the protector is expanded from this cut part against the elasticity of the protector-constituting material and the so-called ankle portion of a hind leg of a dairy cow between calcar (a) and hoof (b) is inserted from the side into a clearance formed between the cut ends of the protector by expansion thereof as shown in FIG. 1, whereby the calcar (a) and hoof (b) are prevented from treding on and stamping down the udder (c). When the cow which has lain down as shown in FIG. 3 is going to stand up with the protector as a fulcrum, the heavy weight of the cow is imposed as a load on the protector and the protector is bent as shown in the drawings. If the acting point of the load of the cow is located on the cut and separated part of the protector, the end faces of the cut and separated part which are usually pressed to each other are opened and separated from each other. In such case, accordingly, there is the risk that the ankle is allowed to become released from the protector.

This disadvantage is due to the fact that the protector is composed of an elastic material and has a cut and separated part.

SUMMARY OF THE INVENTION

It is therefore a primary object of the present invention to provide a connecting member for the above-mentioned udder protector proposed previously by me, which is effective for preventing opening and expansion of the cut end faces of the protector under application of the load.

In accordance with the present invention, there is provided a connecting member for an udder protector composed of a cellular foamed synthetic resin elastic material, which has a side face of a relatively thick plate-like shape and a doughnut-like annular plane shape, one part of said annular protector being cut and separated in the radial direction and both the cut ends being pressed against each other so that they can be forcibly opened and separated from each other and the cow ankle can be inserted into the central hole of the annular protector from the side through a clearance formed between the cut ends, said connecting member comprising two arcuate plates disposed on both the surfaces of the protector to cover said cut part of the protector, each arcuate plate including, on the face confronting the other arcuate plate, male and female projections which are inserted into holes formed on both the sides of the protector with the cut and separated part being the boundary and engaged with female and male projections of the other arcuate plate, respectively.

DETAILED DESCRIPTION OF THE PREFERRED EMBODIMENTS

Figure 1:
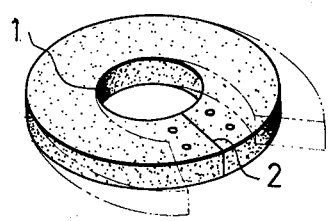
FIG. 1 is a perspective view of an udder protector.
Figure 2:
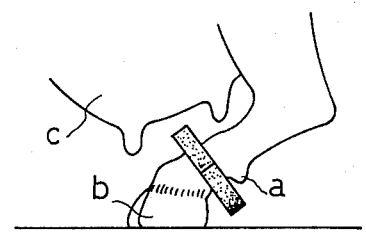
FIGS. 2 and 3 are diagrammatic illustrations showing the state of application of the udder protector shown in FIG. 1.

Referring now to FIG. 1, an udder protector A which is composed of a cellular foamed synthetic resin sponge material has a side face of a relatively thick plate-like shape and a doughnut-like annular plane shape. A central hole 1 of the annular plane shape of the protector A constitutes a part for fittig and attaching an ankle of a dairy cow.

The protector A is cut in the radial direction at one part to form a cut and separated part 2, and both the cut ends of the cut and separated part 2 are pressed against each other and closed by the elasticity of the udder protector-constituting material. When the cut and separated part 2 is forcibly opened outwardly, a clearance is formed between the cut ends and a cow ankle can be inserted into the hole 1 of the protector A from the side through this clearance.

Figure 4:
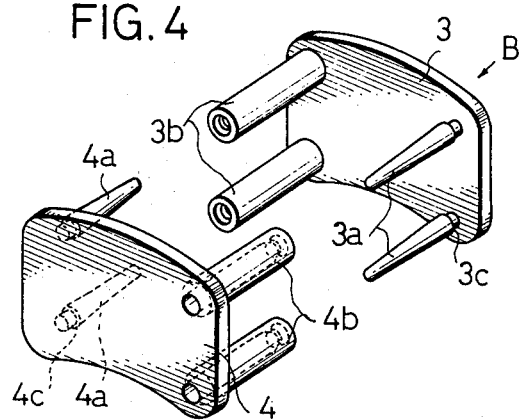
FIG. 4 is a fragmentary perspective view of a connecting member according to the present invention.
Figure 3:
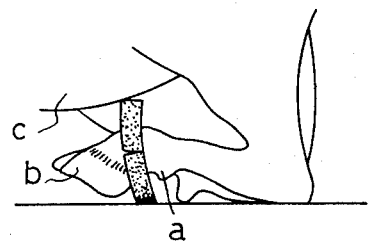

The characteristic feature of the present invention is that the udder protector A having the above structure is combined with a connecting member B as shown in FIG. 4 and the cut and separated part 2 is kept in the unseparable state by this connecting member B.

Referring now to FIG. 4, the connecting member B includes two arcuate plates 3 and 4 composed of a synthetic resin, which are fitted closely adjacent both surfaces of the protector A, respectively, to cover the cut and separated part 2. Each arcuate plate 3 includes, on the face confronting the other arcuate plate 4, a pair of upper and lower male projections 3a on one side and a pair of upper and lower cylindrical female projections 3b, which are disposed symmetrically with similar female and male projections 4b and 4a of the other arcuate plate 4 so that the male and female projections 3a and 3b of one arcuate plate 3 are engaged with the female and male projections 4b and 4a of the other arcuate plate 4, respectively. Engaging parts 3c and 4c are formed on the male projections 3a and 4a, respectively, to expand outwardly of the peripheries of the projections 3a and 4a. Further, stepped parts 3d and 4d are formed in the interiors of the cylinders of the female projections 3b and 4b, respectively, so that the engaging parts 3c and 4c of the male projections 3a and 4a are hung on and engaged with the hanging parts 3d and 4d of the female projections 3b and 4b.

The connecting member B having the above structure is attached to the udder protector A in the following manner.

Figure 5:
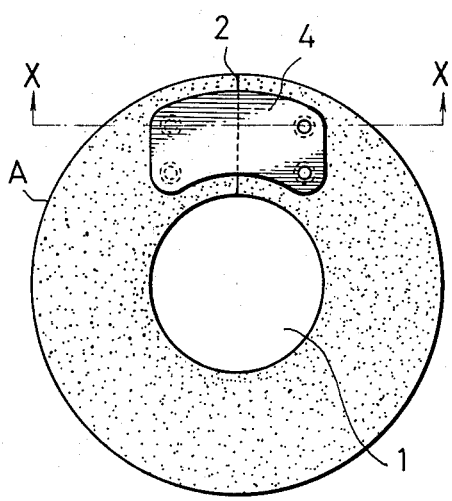
FIG. 5 is a front view showing the state in which the connecting member is fitted to the udder protector.
Figure 6:
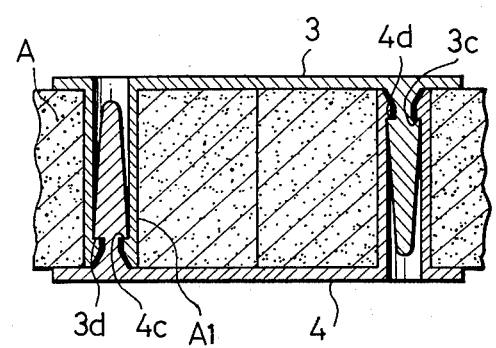
FIG. 6 is a sectional view taken along line X—X in FIG. 5.

The arcuate plates 3 and 4 of the connecting member B are fitted closely on both the surfaces, respectively, of the udder protector A to cover the cut and separated part 2 thereof, as shown in FIG. 5, and the male projections 3a and 4a and the female projections 3b and 3c are inserted into penetrating holes A1 formed on both the sides of the protector A with the cut and separated part being the boundary, whereby the male projections are engaged with the corresponding female projections through the holes A1 as shown in FIG. 6. Thus, the attachment operation is completed. Since the engaging parts 3c and 4c of the male projections 3a and 4a are tightly hung on and engaged with the parts 3d and 4d of the female projections 3b and 4b, the engagement between the male and female projections is positive and locked.

Figure 7:
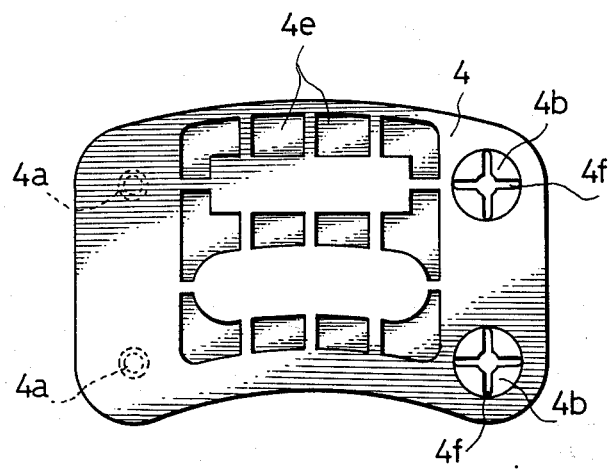
FIG. 7 is a front view illustrating another embodiment of the connecting member.
Figure 8:
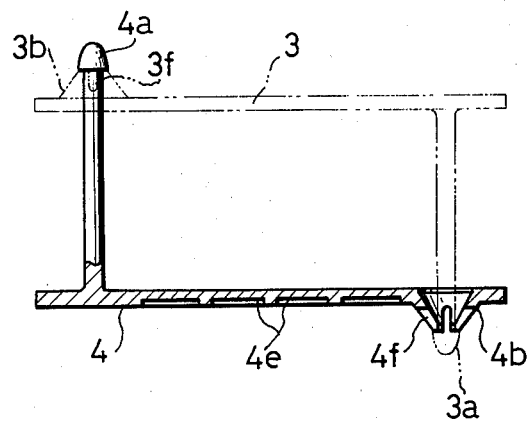
FIG. 8 is a sectional view showing the connecting member illustrating in FIG. 7.
Figure 9:
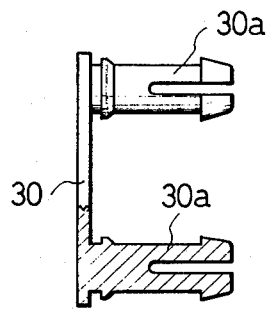
FIGS. 9 to 12 are views showing still another embodiment of the connecting member.
Figure 10:
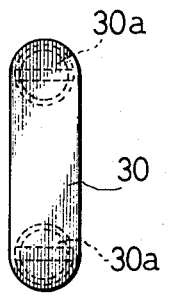
Figure 11:
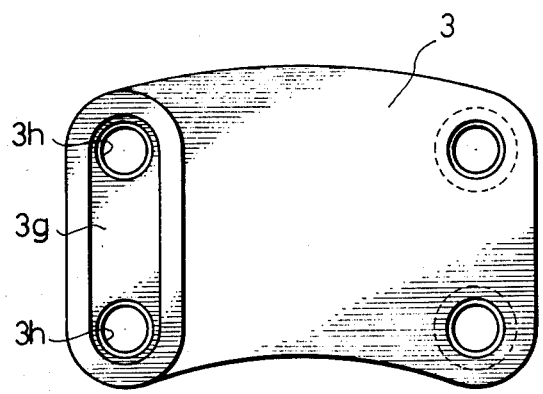
Figure 12:
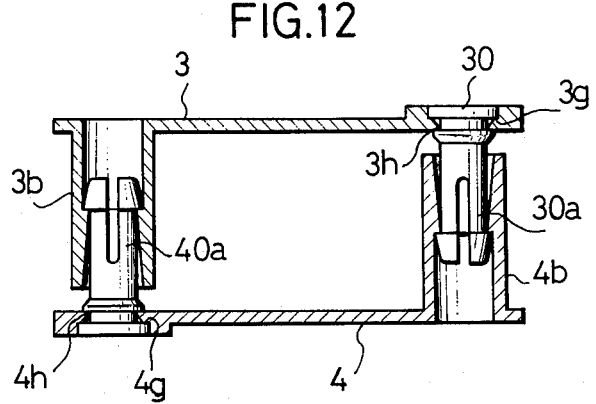

Another embodiment of the connecting member is illustrated in FIGS. 7 and 8. In this embodiment, thin parts 3e and 4e are formed on the arcuate plates 3 and 4 so that a suitable flexibility is imparted to the plates 3 and 4, and slits 3f and 4f are formed on the female projections 3b and 4b of the arcuate plates 3 and 4 so that the slits 3f and 4f extend on the peripheral side in the axial direction. Each female projection has a tapered cylindrical shape and a suitable flexibility is given thereto by virtue of these slits. When the male projections 3a and 4a are engaged with the corresponding female projections 3b and 4b, the top end of each male projection projects slightly outwardly from the top end of the tapered cylinder of the corresponding female projection as shown in FIG. 8, and the engaging parts 3c and 4c of the male projections 3a and 4a are caught on the end faces of the tapered cylinders of the female projections 3b and 4b, whereby disengagement of the male projections 3a and 4a is effectively prevented. Further, a good connecting state can be attained between the udder protector and the connecting member by virtue not only of the elasticity and softness of the protector but also the flexible elasticity of either the arcuate plates 3 and 4 or the female projections 3a and 4a.

Still another embodiment of the connecting member is illustrated in FIGS. 9 to 12. In this embodiment, male projections 30a and 40a having slits extending in the axial direction are formed integrally with fitting plates 30 and 40 separately from arcuate plates 3 and 4. The arcuate plates 3 and 4 are molded from a moderately soft synthetic resin, and concave grooves 3g and 4g are formed on the arcuate plates 3 and 4 so that the fitting plates 30 and 40 can be fitted in these grooves 3g and 4g. Holes 3h and 4h for insertion of the male projections 30a and 40a are formed on the bottoms of the grooves 3g and 4g, respectively. In this embodiment, the connecting member is combined with the protector in the same manner as in the preceding embodiment. Accordingly, the description of the connecting operation in this embodiment is omitted. The reason why a moderate softness is imparted to the arcuate plates 3 and 4 in this embodiment is that as in the embodiment shown in FIGS. 7 and 8, the softness of the plates 3 and 4 is well-balanced with the softness of the protector so as to attain a good connecting state. In this embodiment, however, some troubles are caused when the male projections 30a and 40a are composed of a soft material. Accordingly, the male projections 30a and 40a are made from a rigid synthetic resin, and they are fitted in the grooves 3g and 4g of the arcuate plates 3 and 4. Therefore, there is not brought about the disadvantage that the function of the male projections for supporting the arcuate plates is weakened.

Figure 13:
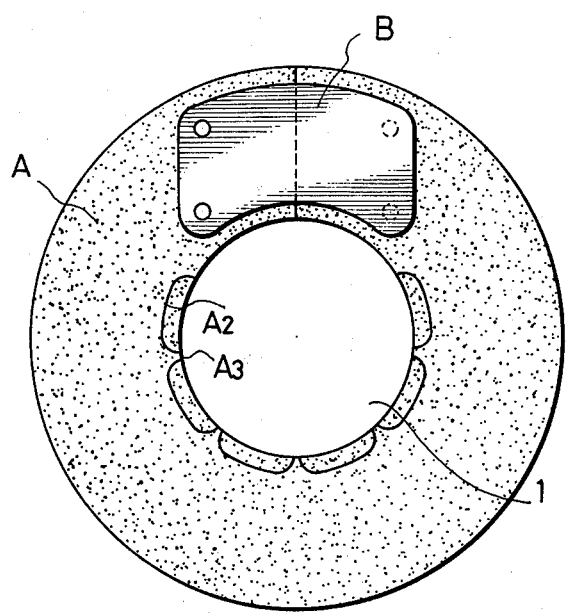
FIG. 13 is a front view of a modification of the udder protector in which notches are formed on the central hole of the protector.

In the protector A shown in FIG. 13, the parts fitting on a cow ankle are formed on the central hole 1 thereof. More specifically, several strippable cut pieces A2 are concentrically formed on the peripheral edge of the central hole 1 and these cut pieces are separated from one another by dot-like connecting parts A3. In this embodiment, if the cut pieces A2 are stripped from the peripheral edge portion of the central hole 1, the hole diameter can easily be made larger, and the hole diameter can be appropriately adjusted depending on the size of the cow ankle.

As will be apparent from the foregoing illustration, according to the present invention, opening of the cut and separated part of the udder protector by the weight of the cow imposed on the protector is effectively prevented and the risk that the udder is injured by the protector which is released from the ankle is completely eliminated. Accordingly, the protector can always be used with safety. Still further, attachment of the protector to a cow ankle through the cut and separated part can be performed very easily. Thus, various advantages can be attained by the present invention.

What is claimed is:

1. A combination of an udder protector composed of a cellular foamed synthetic resin elastic material, which has a side face of a relatively thick plate-like shape and a doughnut-like annular plane shape, one part of said annular protector being cut and separated in the radial direction and both the cut ends being pressed against each other so that they can be forcibly opened and separated from each other and the cow ankle can be inserted into the central hole of the annular protector from the side through a clearance formed between the cut ends, said protector having a diameter greater than the hoof of a cow and when applied to a cow adapted to engage the udder and prevent injury thereto by said hoof, with a connecting member comprising two arcuate plates disposed on both surfaces of the protector to cover said cut part of the protector, each arcuate plate including, on the face confronting the other arcuate plate, male and female projections which are inserted into holes formed in both the sides of the protector with the cut and separated part being the boundary and are engaged with female and male projections of the other arcuate plate, respectively.

2. A combination of the udder protector and the connecting member as set forth in claim 1 comprising strippable cut pieces concentrically formed on the peripheral edge portion of the central hole of the udder protector.

3. A combination of the udder protector and the connecting member as set forth in claim 1 wherein each of the male projections of the arcuate plates of the connecting member has a rod-like shape and includes an engaging part extending outwardly from the peripheral side of the rod at the top end thereof, and each of the female projections has a cylindrical shape allowing insertion of the corresponding male projection thereinto and a recesses part in the interior of the cylinder, which is engaged with the engaging part of the corresponding male projection.

4. A combination of the udder protector and the connecting member as set forth in claim 3 wherein slits extending in the axial direction are formed in the male projections, the male projections being integrally molded with fitting plates separately from said arcuate plates, concave grooves being formed in said fitting plates, and insertion holes for receiving the male projections therein being formed at the bottoms of said concave grooves.

5. A combination of the udder protector and the connecting member as set forth in claim 1 wherein thin parts are included in each of the arcuate plates of the connecting member so that a flexibility is imparted to the arcuate plates, and each of the female projections is molded as a tapered cylinder having slits extending in the axial direction and the top end face of the tapered cylinder is formed as a part to be engaged with the corresponding male projection.

6. A combination of the udder protector and the connecting member as set forth in claim 5 wherein slits extending in the axial direction are formed in the male projections, the male projections being integrally molded with fitting plates separately from said arcuate plate, concave grooves being formed in said fitting plates, and insertion holes for receiving the male projections therein being formed at the bottoms of said concave grooves.

* * * * *